Figure 1:
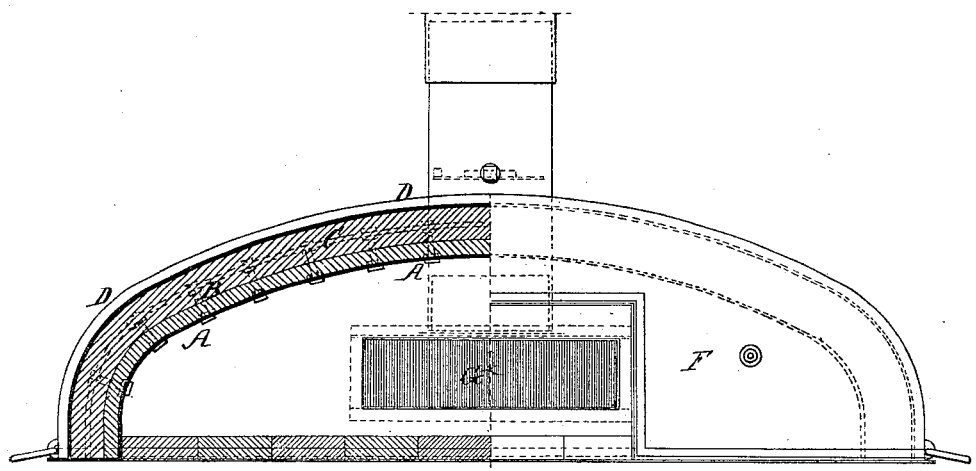

(No Model.) 2 Sheets—Sheet 1.

E. GENESTE.
BAKE OVEN.

No. 265,404. Patented Oct. 3, 1882.

Witnesses:
Harry Drury
Harry Smith

Inventor:
Eugène Geneste
by his Attorneys
Howson and Sons (No Model.)  2 Sheets—Sheet 2.

E. GENESTE.
BAKE OVEN.

No. 265,404. Patented Oct. 3, 1882.

Witnesses:
Harry Drury
Harry Smith

Inventor:
Eugene Geneste
by his Attorneys
Howson and Son

N. PETERS. Photo-Lithographer, Washington, D. C.

UNITED STATES PATENT OFFICE.

EUGÈNE GENESTE, OF PARIS, FRANCE.

BAKE-OVEN.

SPECIFICATION forming part of Letters Patent No. 265,404, dated October 3, 1882.

Application filed April 3, 1882. (No model.) Patented in France December 6, 1881; in Belgium December 27, 1881, and in England December 29, 1881, No. 5,714.

*To all whom it may concern:*

Be it known that I, EUGÈNE GENESTE, engineer, of the firm of Geneste, Herscher & Co., of Paris, in the Republic of France, and acting for the said firm, have invented Improvements in Portable Ovens for Baking Bread and other Aliments, of which the following is a specification.

This invention relates to portable ovens for baking bread and other aliments; and it consists in constructing these ovens in sections, as hereinafter described, whereby they are rendered capable of being transported to localities inaccessible to wheeled vehicles, and the operations of erecting them and taking them to pieces are also greatly expedited and facilitated.

The ovens usually employed for baking bread for the use of armies during a campaign are either complete ovens permanently fixed upon a vehicle or carriage or are capable of being taken to pieces and divided into a number of small packages, which may be transported upon very light vehicles or upon the backs of mules. The ovens belonging to this latter class as heretofore constructed consist generally of a frame or shell of metal made in separable sections, and employed to form the chamber or vault of the oven, the solid part of the walls of the oven being composed of earth. Ovens of this description consist simply of means for more or less expeditiously constructing an oven with common earth. It is evident that to put these ovens in order for working a loss of time is incurred, first, in putting the shell or frame-work together; secondly, in placing the earth in position, and, thirdly, in drying this earth and heating it to the temperature necessary for baking bread. Similar disadvantages also attend the operation of taking down the oven in order to remove it. Now, in the apparatus constructed according to this invention all these disadvantages are removed.

The improved oven is constructed with a series of bays or arched sections, which simply require to be arranged in juxtaposition side by side in order to form a complete oven ready for immediate use. In other words, the improved oven is not composed, as are the ovens ordinarily employed, of sections of the baking-chamber only, but is built up with sections of the oven itself, so that it is simply necessary to put the parts together in order to obtain an oven in working order.

In order that the said invention may be fully understood, I shall now proceed more particularly to describe the same, and for that purpose shall refer to the several figures on the annexed sheet of drawings, the same letters of reference indicating corresponding parts in all the figures.

Figure 3:
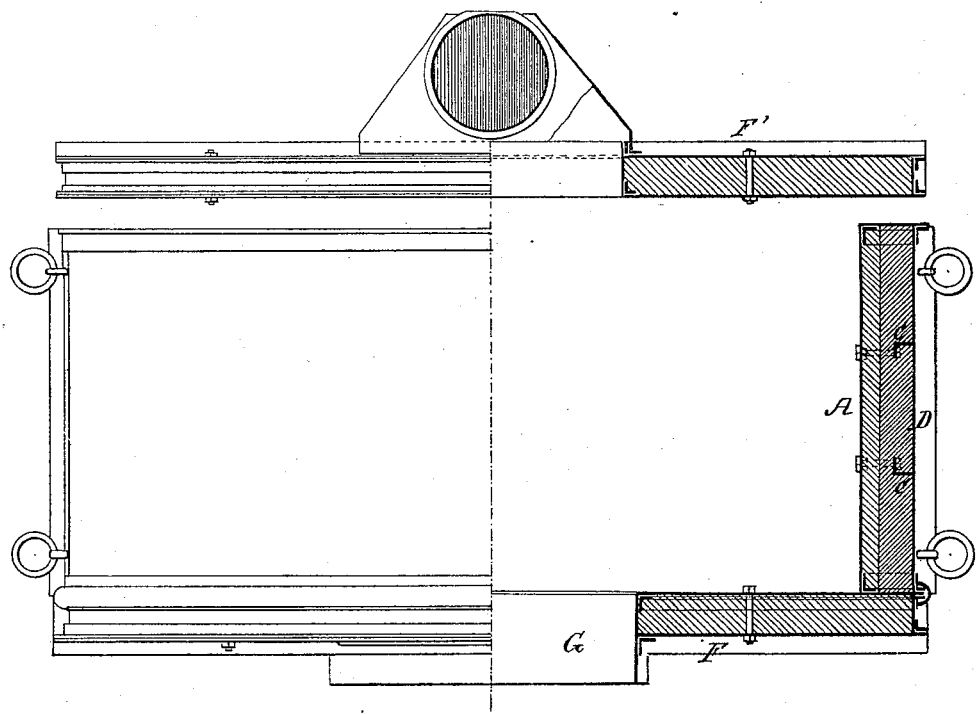
Figure 4:
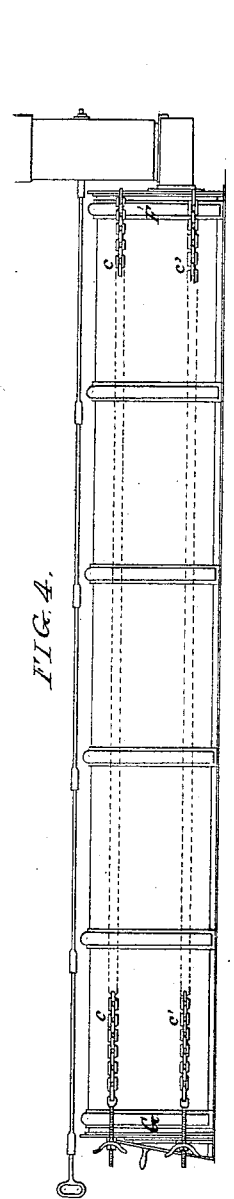
Figure 5:
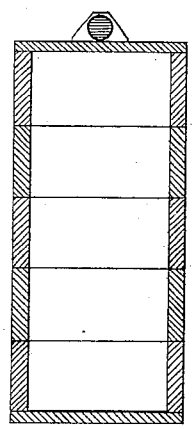
Figure 8:
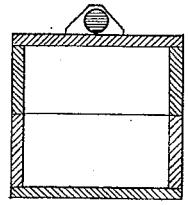
Figure 2:
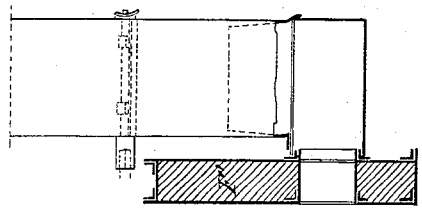
Figure 7:
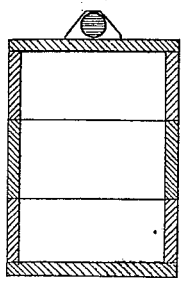
Figure 6:
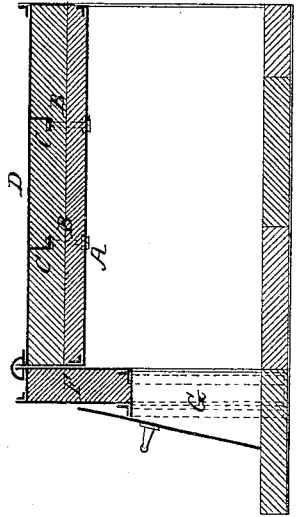

Figure 1 of the accompanying drawings represents one of the bays or sections of the improved oven, partly in elevation and partly in section. Fig. 2 is a corresponding longitudinal and vertical section, and Fig. 3 is a plan partly in section. Fig. 4 is a general view of a combination of the improved sections, arranged for an oven capable of baking ninety rations.

In carrying out this invention the sections of the improved oven are constructed with an arch, A, of sheet-steel, stiffened by iron stays B, bolted to a truss, C. These sections are in the form of an arch or bay, the weight and dimensions of which are so calculated as to correspond with a given quantity of bread, and to enable them to be manipulated with facility and carried on the backs of mules. The arch illustrated in the drawings is adapted to contain eight regulation loaves, each weighing one kilogram and a half, and the weight of the arch itself does not exceed ten kilograms. On the convex side of the arch of steel plates there is placed a layer of cement or plastic material capable of resisting the action of heat, and also capable of storing up the quantity of caloric requisite for the process of baking the bread. This cement is covered with a layer of suitable non-conducting material, in order to prevent loss of heat by radiation, and the whole is inclosed by a sheet-iron envelope, D, An arch or bay thus constructed constitutes a self-sustained section of the sides and roof of the oven, which may be built up with any convenient number of such bays or arches. The bays are arranged side by side, and drawn together by chains $cc'$, connected to screws passed through ears or lugs on end walls, hereinafter described, as shown in the drawings, Fig. 4. These chains are tightened by turning suitable nuts bearing against the said ears or lugs.

The two extremities of the oven are closed by straight vertical end walls, F F', constructed in a similar manner to the arched sections hereinbefore described, being provided internally with layers of fire-proof and non-conducting materials. One of these end walls presents a suitable mouth or opening, G, for working the oven, and the other end wall is provided with a chimney or flue controlled by a damper.

The oven may be provided with a bottom or floor consisting of earthenware panels or tiles supported in a metal frame or frames; but in certain cases this bottom may be dispensed with by a suitable preparation of the ground upon which the oven is erected. The tiles of the floor are bound together by a fire-proof cement, and metal slips or partitions partially embedded in the floor serve to support the shovels used in working the oven, and thus protect the tiles from injury. Each panel or frame of which the floor is composed may correspond in size to one bay or to half a bay, and the weight of the panels is so calculated as to admit of their being carried on the backs of mules.

The improved oven may be fitted together and worked upon a vehicle when the nature of the ground will admit of such an arrangement.

I claim as my invention—

1. A baking-oven composed of two or more separable arches or bays arranged side by side, each arch having its several component parts permanently secured together and forming a self-sustained section, substantially as set forth.

2. A baking-oven consisting of two or more separable arches, each having its component parts permanently secured together and each arch forming a self-sustained structure in itself, and upright pieces at opposite ends, one having a door and the other an outlet to the chimney.

In testimony whereof I have signed my name to this specification in the presence of two subscribing witnesses.

EUGÈNE GENESTE.

Witnesses:
ALFRED COINY,
ROBT. M. HOOPER.